Sheet 1 - 3 Sheets.
B. A. Mason,
Making Wood Screws,
Nº 61,749. Patented Feb 5, 1867.
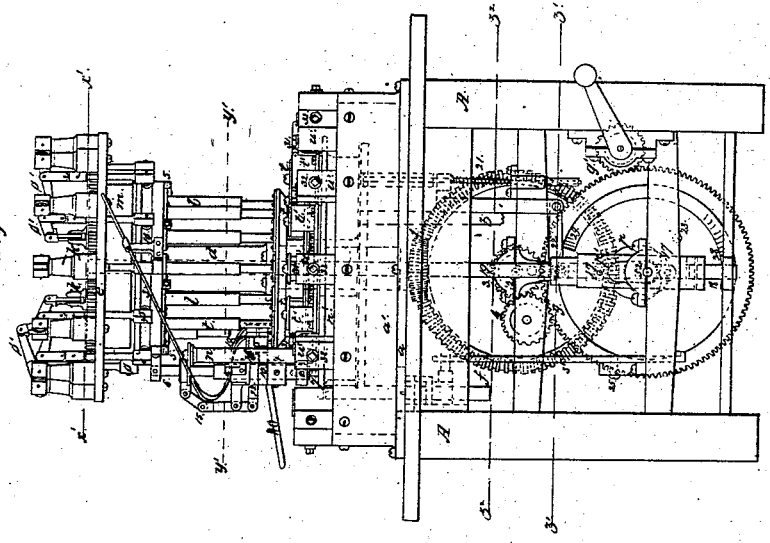
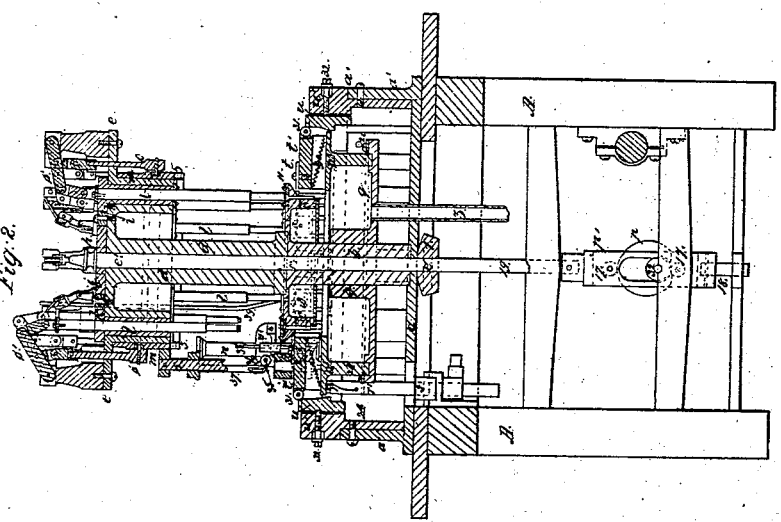
Witnesses:
Thos. Geo. Harold
Geo. D. Walker
Inventor:
Benj. A. Mason

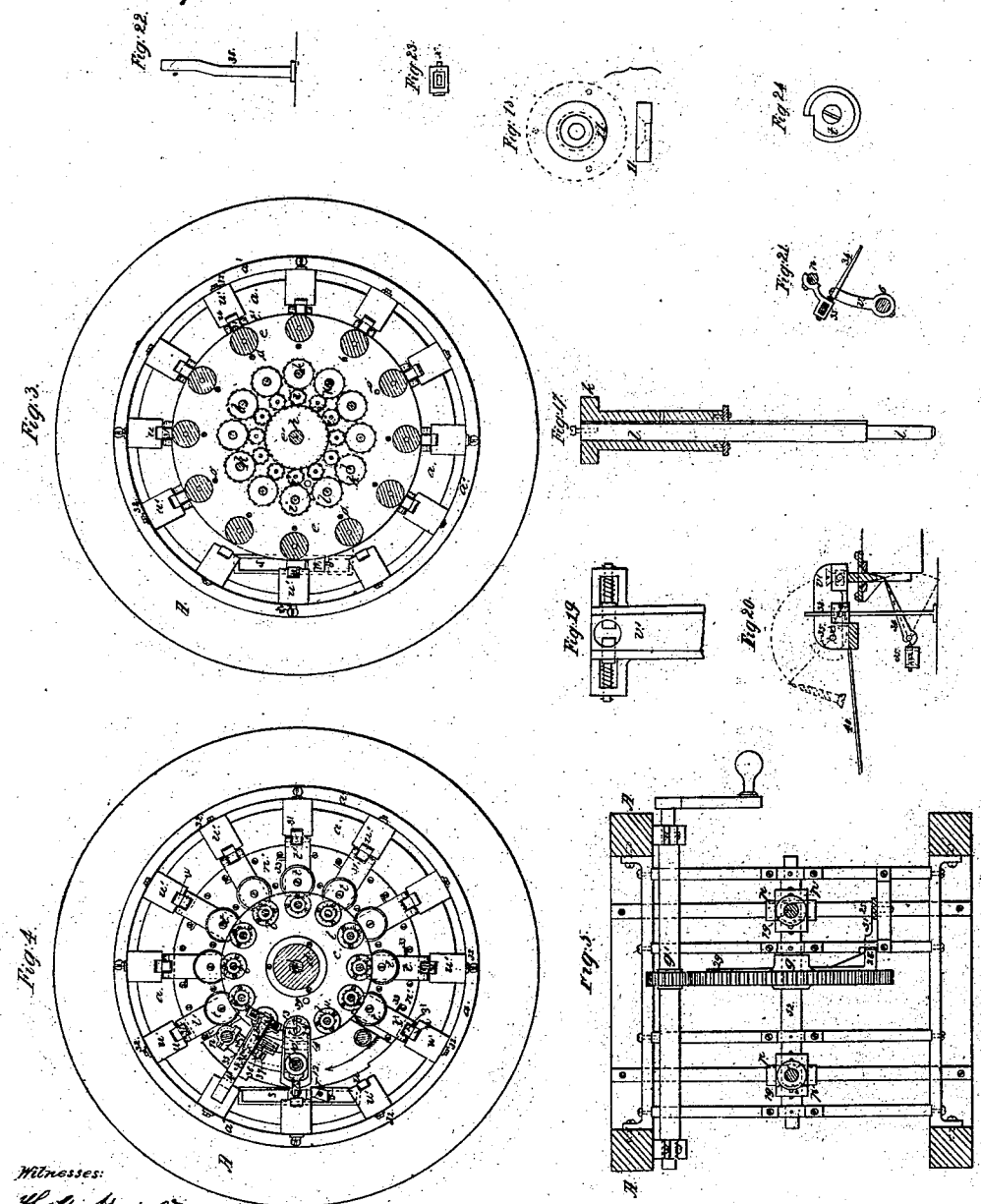

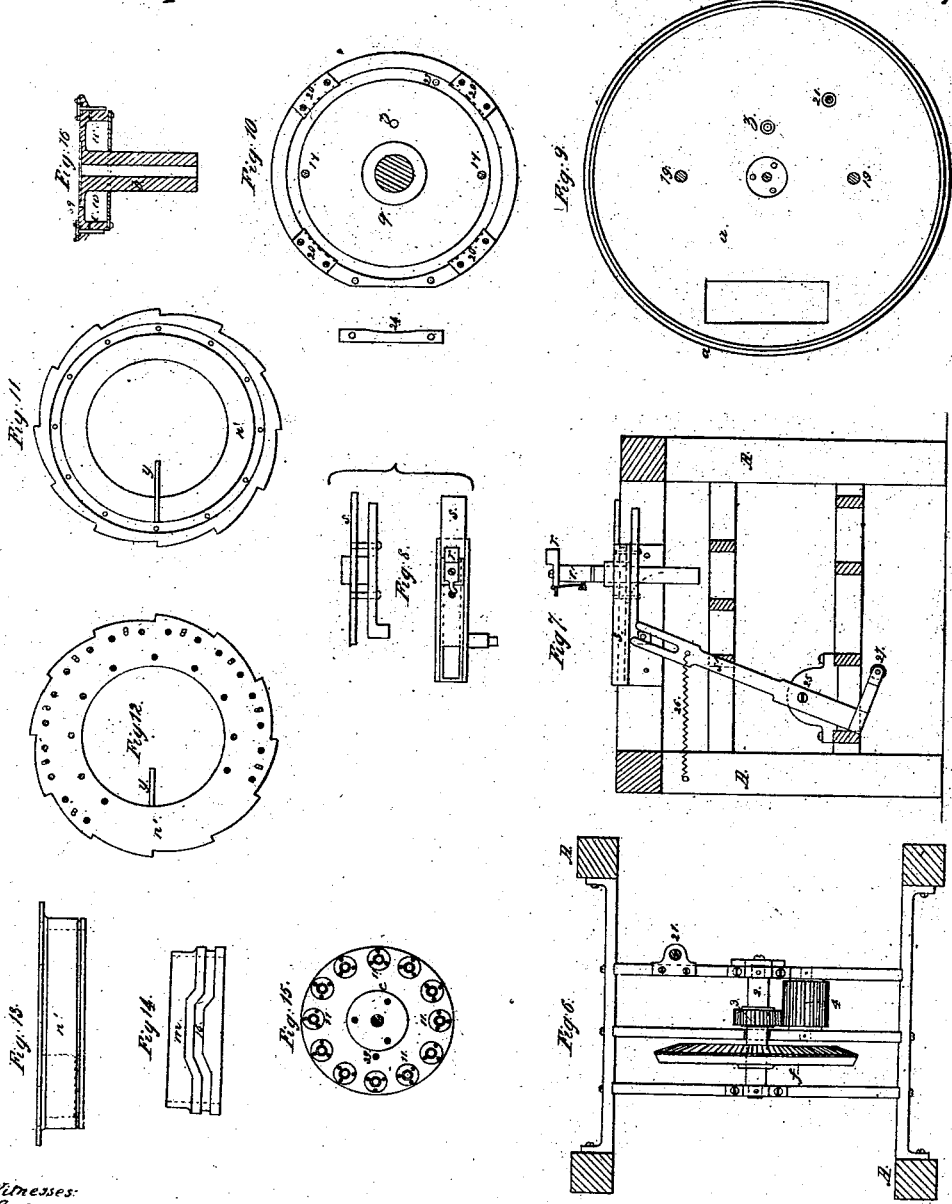

United States Patent Office.

BENJAMIN A. MASON, OF NEW YORK, N. Y.

Letters Patent No. 61,749, dated February 5, 1867.

IMPROVEMENTS IN SCREW-MAKING MACHINES.

*The Schedule referred to in these Letters Patent and making part of the same.*

TO ALL WHOM IT MAY CONCERN:

Be it known that I, BENJAMIN A. MASON, of the city, and State of New York, have invented, made, and applied to use, a certain new and useful Improvement in Machinery for Threading Metallic Screws; and I do hereby declare the following to be a full, clear, and exact description of the said invention, reference being had to the annexed drawing, making part of this specification, wherein—

Figure 1 is a general elevation of the machine.

Figure 2 is a vertical section of the same.

Figure 3 is a plan of parts below the line $x'$.

Figure 4 is a plan of parts below the line $y'$.

Figure 5 is a plan of the frame and gearing below the line $z^1$; and

Figure 6 is a similar view below the line $z^2$.

The other figures are separately referred to, and similar marks of reference denote the same parts.

My machine is for cutting the thread upon a metallic blank to form a screw. To effect this the headed blank is supplied automatically from a slide into a chuck and rotated by a driver while being operated upon by cutters. There are several of these chucks arranged in a circle around a head block, and the feeding mechanism is moved successively from one to the other; and I employ a delivery mechanism that acts in advance of the feeding mechanism to take the finished screw out of the chuck, so that the said chuck may at the next moment receive a blank. I arrange a series of cutters around upon a circular tool-carrier that is moved progressively from one screw blank to the next, and during the pause between the movements, the said tool-carrier is lowered bodily at a speed proportioned to the revolution of the screw blanks, so that the cutters take off, successively, a shaving from the screw-blank, each one cutting deeper than its predecessor, until the thread is completely cut and the finished screw is delivered; hence, after the machine is filled with screw blanks, there is one screw completed and delivered each movement of the mechanism, and a blank deposited in the machine, the other screw blanks being in progressive stages of completion.

In the drawing, A is a frame of suitable strength to carry the parts. $a$ is the bed of the machine, with a circular edge, $a'$, seen also in the detached plan, fig. 9. $b$ is a column, bolted fast at its lower end to the bed $a$, and formed at its upper end as a hollow circular head-block, $c$, (see detached views, figs. 15 and 16.) Around the periphery of this head-block are grooves, in which the screw blanks hang while being rotated and cut. The upper edge of this head-block projects as a flange, in which are recesses receiving the chucks 11 (see fig. 18) for the screw blanks to hang in, and said chucks, revolving with the screw blanks, keep them much more accurately in place, and prevent the wear which would arise from the screw head itself revolving in and against the sides of a socket. The chucks 11 are kept in place by a ring cap, seen in figs. 1, 2, and 4, and in dotted lines in fig. 18, the same being screwed down upon the surface of the head $c$. Above, and attached firmly to the head $c$, rises the hollow column $d$, formed at the upper end as a table, $e$, for the gears that rotate the screw-drivers. $e'$ is a central shaft, passing through the columns $b$ and $d$, and having at its lower end the gear 1, that receives motion from the mitre-wheel $f$ upon the shaft 2, having a pinion, 8, driven by the wheel 4, (see fig. 6,) that gears into the wheel $g$ upon a shaft, 52, (see fig. 5,) which is driven by the pinion $g'$ that is on a shaft actuated by any suitable motor to impart motion to the whole machine. Upon the upper end of the shaft $e'$ is a central gear, $h$, rotating the series of intermediate gears, $i$, that in turn revolve the gears $k$ and screw-drivers $l$. The gears $k$ are formed as sleeves passing through the table $e$, and at their lower ends ring-plates are attached, as seen in figs. 2 and 17, to prevent the gears rising from the table $e$, as the screw-drivers $l$ are given an endwise movement through the said gears, and the screw-drivers have each a longitudinal slot taking a screw or pin, (fig. 17,) so that rotation shall be given by the gears $k$ to the screw-drivers, but the latter can be moved endwise by the cam-ring $m$ (figs. 1, 2, and 14) that surrounds the lower portion of the table $e$, and is sustained by rollers 5, and is rotated as hereafter described. This ring $m$ has a cam-groove 16, that receives rollers at the lower ends of the lifting rods $o$ that act upon levers, $o'$, which are attached at their outer ends by links, and swivels to the upper end of the screw-drivers $l$. The cam-groove 16 and connections lift the screw-drivers up successively, while a finished screw is being taken out of one of the chucks 11, and a blank placed in the chuck from which the finished screw had been previously removed; then the cam-groove 16 lowers the screw-driver down upon the screw head, and said screw-driver, being formed slightly rounding at the corners, or convex, and rotating, enters the nick in the head of the blank without marring said head, and the screw-driver is held down firmly to said head by the action of the said cam 16. The edges of the screw-drivers heretofore usually employed are square, and hence they do not always freely enter the nick in the screw head, but mar said head when operated by a positive motion; but by having the end slightly convex, the driver enters the nick without any risk of marring the head. The screw blanks headed, nicked, shaved, and formed with a tapering point, are fed into the machine by being supplied into the inclined slide 8, at the bottom of which is a block extending as an arm, 10, from the column 6 that hangs from the edge of the ring m, and said arm 10 has a hole at its end, the size of the screw head, and a notch in its side sufficient to pass the shaft of the blank. n' is a circular tool-carrier moved around progressively, as hereafter described, and having also an up-and-down movement. Upon this carrier n' are columns, n, with a cross-head piece, through which the column 6 passes, and the lower end of this column 6 is hollow, receiving a stud, 7, on the carrier n'. By this construction the carrier n' and parts connected, including the cam-ring m, are moved around, so that the block 10 pauses over each of the chucks 11 successively, and the rise and fall movement of the said carrier n' operates through the columns n and links 15 upon a slide, 12, that has at one end a shank retainer, 14, and at the other end a head retainer, 13. The retainer 13, sliding over the hole in 10, prevents the head from passing down, and the retainer 14, sliding between the shanks of the first and second blanks, keeps those in the ways 8 from sliding down, and the moving of 13 back at the same time towards the axis of the machine, allows the one blank to drop into its chuck through the hole in 10. The retainer 13 has a pin attached to it that projects sidewise into the hole at the end of the arm 10, so that the shank of the blank may hang against this pin and thereby remain in a vertical position, so as to fall correctly into the chuck 11 when the said retainer 13 and its pin are moved back, as aforesaid. The tool-carrier n' is supported upon a circular bed, q, the two being connected by plates 20, on the edges of q, entering a groove around the lower part of the carrier n', (see fig. 10, plan of bed q, fig. 13, side view of carrier n', also fig. 2.) The bed q has given to it a rise and fall movement, and the carrier n' a progressively rotary movement upon the bed q. To raise and lower the bed q, and with it the carrier n', I employ the cams p p on the shaft 52, acting upon rollers 17 in the cam-boxes p' that are guided by rods 18 at their lower ends, passing into holes in the cross-piece of the frame, and from the upper ends of p' rods 19 pass through the bed a, and are attached to the bed q. The shape of the cams p is such that the tool-carrier n' will be lowered regularly the pitch of the screw-thread each revolution of the screw blank, the gearing being proportioned accordingly, so that the cutters t, carried by said ring n', shall act to form the screw-thread upon the blanks, and each cutter, t, is brought round in succession and cuts deeper to take off a shaving until the screw is completed. This presentation of the cutters to the screw blanks is effected by the progressive rotation of the carrier n' by the pawl r, (see figs. 2, 4 7, and 8.) This pawl r is upon a vertical bar, r', passing through a carriage, s, set to slide in ways below the bed a, and this carriage s is moved by a bent lever, s', on a fulcrum, 25, with a roller, 27, kept against the face-cams 28 29 on the wheel g by the spring 26, which also draws back the pawl r. In the side of the bar r' is a notch, receiving the plate 24 that is bolted at one side of bed q, so that as said bed q is raised or lowered, as aforesaid, the bar r' may be slid up or down through the carriage s, and thereby the pawl r be kept in position to act upon the ratchet teeth around the edge of the carrier n', whether in a raised or lowered position. The shape of the face-cam 28 29 is such that after the carrier n' has descended, and the tools t cut the threads upon the screw blanks, the cam 29, acting upon the pawl r through the medium of the lever s', gives a partial rotation to the carrier n', and in this position the carrier n' is raised by the cams p; then the cam 28, coming into action, completes the movement of the pawl r and the turning of the bed, so as to bring the cutters around to the next screw blanks, and they then are lowered and cut as before named. In order to hold the tool-carrier n' steady while descending and cutting the screw blanks, I make use of the spring-sliding bolt 21, passing through the bed q and entering holes in the lower edge of the tool-carrier n', (see inverted plan, fig. 11.) This bolt is withdrawn previous to commencing each progressive rotation of the bed n' by the bent lever 22, acted upon by the stud 23 on the wheel g. Each cutter t is formed of a disk of steel, turned true with the edge, of the same sectional shape as the screw-thread, and a notch is ground in the edge of said disk, (see fig. 24,) to produce a cutting edge. Cutters made in this manner do not require any adjustment, and when the cutting edge wears dull, it is only necessary to grind off the radial face, and to turn the cutter upon its central bolt sufficient to bring the cutting edge on the line of the centre of the sliding stocks t', which stand on the carrier n', in a radial position, (see fig. 4.) Each cutter stock t' is arranged so as to slide upon the carrier n', and the cutters and stocks are drawn away from the screw blanks by springs 30. u' are guide blocks, fastened upon the rim a' of the bed a, and correspond in number with the chucks 11, and each one is placed on a radial line, passing from the centre of the machine through the corresponding chuck 11. In vertical mortises in the inner ends of the block n' I place the tool guides u, the inner faces of which correspond in shape with the screw to be cut, and they are all accurately placed at the same distance from the centre of the machine; and 32 are adjusting screws, and 31 are rollers on the outer ends of the cutter stocks t', taking against the faces of the tool guides u, and moving the cutter inwards as the carrier n' descends. The progression of the carrier n' is in the direction shown by the arrow, fig. 4, and hence the cutter t, that follows around, behind, and next to the arm 10, makes the first cut, and as the cutters are brought around successively, they each cut deeper until the screw is finished. The depth of each cut is regulated by the size of the rollers 31, they being of regular increasing size from the first to the last.

By this construction, the parts are adapted to cutting varying sizes of screws. By changing the tool guide u, the shape of the point can be varied; by adjusting these blocks u by the screws 32, larger or smaller-sized screws can be cut, the chucks 11 being changed to suit the size of wire and head, and by changing the cams p the number of threads to the inch can be changed, and the machine adapted to longer or shorter screws within the given range of the machine. In order to deliver the screws, when finished, from the machine, I make use of a raiser, 34, on an arm, v, that extends from the column 6, (see figs. 20 and 21,) and 35 is a spring toe on an arm from the column n, which, taking the outer end of the raiser 34 as the column n descends, causes the inner end of 34 to force up the finished screw between two spring jaws on a lifter, v', (see figs. 19 and 20,) which yield as the screw head passes through between them. This lifter v' is on an axis, 35, with an arm, 36, (see fig. 2,) to which is connected a link, 37, from the cross-bar between the column n, so that after the screw head passes through between the spring jaws, the lifter v' is swung over, and the screw dropped out upon a delivery chute, 40. In order to hold the lifter v' down while the screw is being forced up between its spring jaws, I employ a bolt, x, figs. 20 and 23, which is moved in and out by a double-acting wedge, 38, (see figs. 20 and 22,) which is attached to n', and in moving up and down therewith slides the bolt x at the proper time, either to hold down the lifter v', or allow it to be swung up and over. The head block c is made hollow at w, figs. 2 and 16, and is supplied with water or other liquid by a pipe, 39, and the liquid passes out in jets at the inner sides of the grooves in which the screw blanks revolve, so as to lubricate the blanks and cutters. The chips and liquid fall into the chamber formed above the bed q, and inside the tool-carrier n'; and a scraper, y, figs. 11 and 12, causes the said chips and liquid to be conveyed around to a delivery pipe, z'.

What I claim, and desire to secure by Letters Patent, is—

1. The arrangement of the slide 12, inclined ways 8, and retainers 13 and 14 to supply the blanks, one at a time, to the machine, substantially as set forth.

2. I claim the arrangement of mechanism for actuating the screw-drivers l, consisting in the revolving cam-ring m, rods o, levers o', and shackles, in combination with the sleeve gears k, for rotating said screw-drivers, as set forth.

3. I claim the chucks 11 for holding the blanks, in combination with the screw-drivers, for revolving such blanks, and the cutters for forming the thread, as set forth.

4. I claim a series of screw-drivers and screw blank holders, arranged in a circular position, in combination with a series of cutters, moved around outside the screw blanks, and acting to cut the thread on such blanks by progressive cuts, the cutters being caused to move lengthwise of the screw blanks, and then pass to the next screws, substantially as set forth.

5. I claim the tool guides u, supported by the blocks u', and adjusted by the screws 32, in combination with the sliding cutter stocks t' and cutters t, substantially as set forth.

6. I claim, in a screw-cutting machine, a series of cutters t, formed as specified, and attached to the stocks t', in combination with the series of rollers 31, of gradually-increasing size, as and for the purposes specified.

7. I claim the pawl r, carriage s, and plate 24, in combination with the tool-carrier n' and bed q, for the purposes and substantially as set forth.

8. I claim the bed q, tools and carrier n', and cams p p, in combination with mechanism, substantially as set forth, for rotating the screw blanks, whereby the screw-threads are formed by the descent of the carrier n', with a speed proportioned to the rotation of the screw blanks.

9. I claim the bolt 21 and actuating lever 22, in combination with the pawl r, lever s, and tool-carrier n', arranged and operating substantially as and for the purposes specified.

10. I claim the raiser 34 and lifting jaws v', fitted and actuated substantially as and for the purposes specified.

11. I claim the tool-carrier n', to which a progressive rotary movement is imparted, in combination with the bed q, to which a rising and falling movement is given, substantially as set forth, so that the tools may have imparted to them a movement parallel with the axis of rotation, as well as a progressive rotary movement, as specified.

12. I claim the head block c', formed with a cavity, w, for water or other liquid, and from which jets pass to the screw blanks, as specified.

In witness whereof I have hereunto set my signature this tenth day of October, A. D. 1866.

BENJ. A. MASON.

Witnesses:
   THOS. GEO. HAROLD,
   GEO. D. WALKER.